E. PHILLIPSON.
VALVE.
APPLICATION FILED APR. 5, 1906.
927,593.
Patented July 13, 1909.
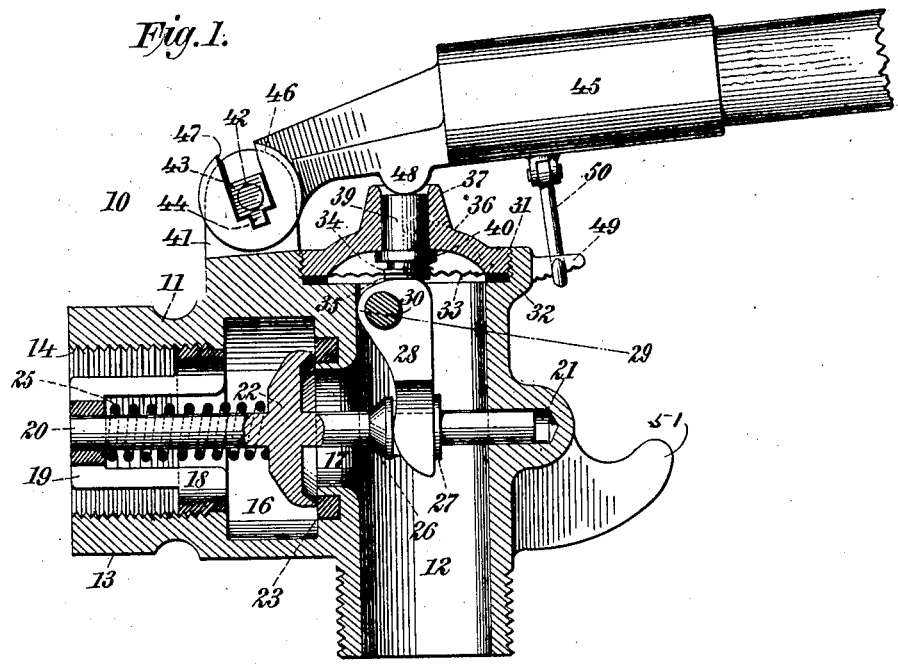
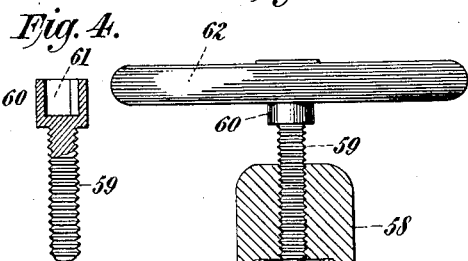
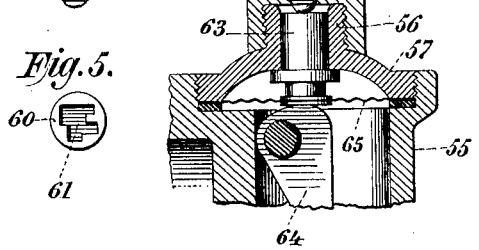
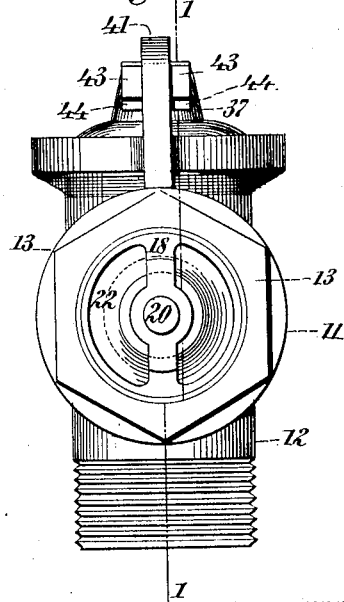
WITNESSES:
Gustav Dieterich
Edwin H. Dietrich
INVENTOR
Emil Phillipson
BY
Straley & Hachenack
his ATTORNEYS

UNITED STATES PATENT OFFICE.

EMIL PHILLIPSON, OF NEW YORK, N. Y., ASSIGNOR OF ONE-HALF TO THEODORE G. WALPUSKI, OF NEW YORK, N. Y.

VALVE.

No. 927,593.

Specification of Letters Patent.

Patented July 13, 1909.

Application filed April 5, 1906. Serial No. 309,981.

*To all whom it may concern:*

Be it known that I, EMIL PHILLIPSON, a citizen of the United States, residing at the city of New York, borough of Manhattan, in the county and State of New York, have invented certain new and useful Improvements in Valves, of which the following is a full, clear, and exact specification.

My invention relates to improvements in means for controlling the flow or transfer of fluids from a container or receptacle, and the same has for its object more particularly to provide a valve with means for actuating the same so arranged that the valve cannot be operated except by means of a separate key or device of distinctive shape and form.

Further said invention has for its object to provide a valve which will not leak when fluid under pressure is transferred from the container to which the same is attached to another receptacle or container by means of a closed connection, such as a flexible tube or pipe.

To the attainment of the objects and ends aforesaid my invention consists in the novel details of construction and in the combination, connection and arrangement of parts hereinafter more fully described and then pointed out in the claims.

In the accompanying drawings forming part of this specification, wherein like numerals of reference indicate like parts, Figure 1 is a central longitudinal section on the line 1—1 of Fig. 2, showing one form of a valve made according to and embodying my invention; Fig. 2 is an end view thereof, with the operating lever removed; Fig. 3 is a detail central section showing the upper part of a valve embodying a modified construction; Fig. 4 is a side view, partly in section, of the valve operating screw, and Fig. 5 is a top view thereof.

In said drawings 10 designates the valve casing comprising a horizontal cylindrical portion 11 and a vertical cylindrical portion 12 forming a nozzle arranged at right angles to said horizontal portion and communicating therewith. The portion 11 is provided upon its outer surface at its rear end with a hexagonal head 13, and upon its inner surface with screw threads 14. Intermediate said threaded rear end and the vertical portion 12, the said portion 11 is provided with an enlarged portion forming a valve chamber 16 which communicates with the vertical portion 12 through an opening 17.

Within the threaded portion 11 adjacent to the valve chamber 16 is secured a spider 18 having rearwardly extending arms terminating in a bearing 19, within which is supported the rear end of a reciprocable valve stem 20 which is supported at its forward end in a bearing 21 provided within the vertical portion 12.

22 denotes a valve arranged within the chamber 16 upon the stem 20 adapted to seat upon an annular valve seat 23 formed of suitable metal or material disposed in an annular groove surrounding the opening 17 and 25 denotes a spring disposed upon the rear end of the valve stem 20 intermediate the bearing 19 and valve 22 whereby to normally hold the latter pressed to its seat. Upon the forward end of the valve stem 20 within the vertical or nozzle portion 12 are provided collars 26, 27 between which is disposed the lower bifurcated end of a lever 28 which is provided near its upper end with a lateral projection 29 through which extends a pivot or short shaft 30 which is supported at its opposite ends in suitable bearings in the vertical or nozzle portion 12. The upper end of said vertical or nozzle portion 12 has a recessed, threaded portion 31 in which is disposed an annular gasket 32, a flexible metal diaphragm 33 having metal disks 34, 35 secured together upon the upper and lower surfaces of said disk at the center thereof, and 36 denotes a screw-cap secured within the upper end of said vertical or nozzle portion 12. Said cap 36 is provided at its center with an upwardly projecting boss 37 having an aperture extending therethrough in the lower end of which is disposed a stud 39 provided with a rim or flange 40 below said cap 36. The lower end of the stud 39 bears upon the disk 34 on the diaphragm 33, and the disk 35 directly below the same contacts with the upper end of the lever 28.

Upon the horizontal portion 11 directly above the valve chamber 16 is an upwardly projecting lug 41, in which is mounted a pin or stud 42 having fixed upon its outer ends substantially square heads 43, 43 provided with projections 44, 44, and 45 denotes an operating handle having a bifurcated end 46 provided with recesses 47, 47 conformed at their inner ends to the square heads 43, 43 of the pin or stud 42 on the valve casing.

48 denotes a projection arranged upon the underside of the handle 45 adjacent to its bifurcated end which projection is adapted to bear upon the upper end of the stud 39 arranged in the cap 36.

50 denotes a hook which is pivotally secured to the underside of the handle 45 and adapted to engage an eye or loop 49 on the upper end of the portion 12 of the valve casing whereby to hold said handle to its depressed position. Upon the front of the vertical or nozzle portion 12 is a hook 51 for supporting a receptacle below said nozzle.

The operation of the valve is as follows: By depressing the handle 45, the projection 48 will bear upon the stud 39 depress the diaphragm 33, the upper end of the lever 28, and force the lower bifurcated end thereof inward, and cause the same to shift the valve stem 20 rearward and unseat the valve 22. The valve 22 will remain unseated as long as pressure is applied to the handle 45, or the same locked to its depressed position by the hook 50. As soon as the hook is released or the pressure upon the handle 45 removed, the valve 22 will immediately seat under the influence of the spring 25.

In the modification illustrated at Fig. 3, the body of the valve 55 is constructed as hereinabove described, except that in this construction I provide the boss 56 on the cap 57 with exterior screw-threads, and fit a cover 58 thereon having a smaller threaded aperture extending therethrough in which works an operating screw 59 having a head 60 provided in its upper surface with an irregular recess 61 adapted to receive a conformed projection on the under side of a handwheel 62. The lower end of said screw 59 bears upon the upper end of a stud 63 contacting with the upper of the disks on the diaphragm interposed between the said stud 63 and the lever 64.

The operation of this structure is obvious. It will be noted that in my improved valve the operating parts are all contained within a sealed casing having only an opening or nozzle for the passage of the fluid therethrough, and that by this arrangement it becomes possible to transfer fluids (particularly those under pressure) from one receptacle or container to another without danger or possibility of leakage, and further by the particular form of operating devices employed to actuate the valve it becomes impossible for a stranger to tamper therewith.

Having thus described my invention, what I claim and desire to secure by Letters Patent is:

1. A valve comprising a casing, a diaphragm therein, a valve arranged in said casing, a stem therefor, a lever pivotally mounted in said casing intermediate said stem and diaphragm, said lever having its respective ends in engagement with said stem and diaphragm, an operating means arranged wholly without the casing, and adapted for attachment thereto and a device interposed between said operating means and said diaphragm whereby to actuate said valve, substantially as specified.

2. A valve comprising a casing, a diaphragm therein, a valve arranged in said casing, a stem therefor, a member on said stem, a lever pivotally mounted in said casing intermediate said stem and diaphragm, said lever having its respective ends in engagement with the member on said stem and diaphragm, means for actuating said lever, and a device interposed between and contacting with said actuating means and said diaphragm, substantially as specified.

3. A valve comprising a casing, a diaphragm therein, a normally seated valve arranged in said casing, a stem therefor, a member on said stem, a lever pivotally mounted in said casing intermediate said stem and diaphragm, said lever having one end forked and in engagement with the member on said stem and its other end in engagement with said diaphragm, means for actuating said lever, and a reciprocating device interposed between and contacting with the last-named end of said lever and the means for actuating said lever, substantially as specified.

4. A valve comprising a casing, a valve therein, a stem therefor, a recessed collar on said stem a lever pivotally mounted in said casing having one end forked and in engagement with said recessed collar, a diaphragm arranged in said casing above the other end of said lever, and adapted for contact therewith, means for actuating said lever, and a movable member arranged above said diaphragm and interposed between the upper end of said lever and the means for operating the same, substantially as specified.

5. A valve comprising a casing, a valve therein, a stem therefor, a spring for holding said valve normally seated, a lever pivotally mounted in said casing having its lower end in engagement with said valve stem, a diaphragm arranged in said casing above the pivoted end of said lever, and adapted for contact therewith, a cap for securing said diaphragm, a movable member arranged in said cap above the upper end of the lever, and an operating device adapted for attachment to said valve and to engage the movable member, substantially as specified.

6. A valve comprising a casing, a valve therein, a stem therefor supported at its end in said casing, collars on said stem, a lever pivotally mounted in said casing having its lower end forked and engaging said stem intermediate the collars thereon, a diaphragm arranged in said casing above the pivoted end of said lever, a reinforcement secured to said diaphragm, a cap for securing said diaphragm in position in said casing, a stud movably arranged in said cap above the pivoted end of said lever, a handle, means for attaching said handle to the valve casing, means on said handle adapted to engage the movable stud in the cap thereof, and means for securing said handle in position, substantially as specified.

7. A valve comprising a casing, consisting of horizontal portion, and a nozzle portion arranged at an angle thereto, a valve arranged in the horizontal portion of said casing, a stem therefor supported at its ends in said nozzle and horizontal portions, a spring for holding said valve normally seated, collars arranged upon said stem; a lever pivotally mounted in the nozzle, having its lower end forked and engaging said stem between the collars thereof, a diaphragm arranged in the upper end of said nozzle, reinforcements thereon above the upper end of said lever, a cap for securing said diaphragm, a stud movably arranged in said casing above said diaphragm and the reinforcements thereon, a lug on said casing, a pin supported therein having heads at its ends, a handle having a bifurcated end provided with recesses conforming to and adapted to engage the heads on said pin, a projection on said handle adapted to engage the stud in the valve cap, an eye on said handle, and a hook on said casing adapted to engage said eye, whereby to hold said handle to its adjusted position, substantially as specified.

Signed at the city of New York, in the county and State of New York, this thirty-first day of March, nineteen hundred and six.

EMIL PHILLIPSON.

Witnesses:
  CONRAD A. DIETERICH,
  JOSEPH G. QUINN, Jr.